United States Patent
Alink

(10) Patent No.: US 12,308,490 B2
(45) Date of Patent: May 20, 2025

(54) WATER-BASED, COMBINED COOLING AND HUMIDIFICATION SYSTEM FOR A FUEL CELL SYSTEM

(71) Applicant: Aerostack GmbH, Dettingen an der Ems (DE)

(72) Inventor: Robert Alink, Dettingen an der Ems (DE)

(73) Assignee: Aerostack GmbH, Dettingen an der Erms (DE)

(*) Notice: Subject to any disclaimer, the term of this patent is extended or adjusted under 35 U.S.C. 154(b) by 211 days.

(21) Appl. No.: 17/861,739

(22) Filed: Jul. 11, 2022

(65) Prior Publication Data
US 2023/0010823 A1    Jan. 12, 2023

(30) Foreign Application Priority Data
Jul. 12, 2021 (DE) .......................... 102021117941.6

(51) Int. Cl.
*H01M 8/04119* (2016.01)
*B60L 58/33* (2019.01)
(Continued)

(52) U.S. Cl.
CPC ........ *H01M 8/04134* (2013.01); *B64D 27/24* (2013.01); *B64D 33/08* (2013.01);
(Continued)

(58) Field of Classification Search
CPC ......... H01M 8/04134; H01M 8/04029; H01M 8/04067; H01M 8/04164; H01M 8/04201;
(Continued)

(56) References Cited

U.S. PATENT DOCUMENTS

| | | | |
|---|---|---|---|
| 6,391,485 B1* | 5/2002 | Perry | H01M 8/04029 429/429 |
| 2008/0001026 A1* | 1/2008 | Hoffjann | H01M 8/04186 4/316 |

(Continued)

FOREIGN PATENT DOCUMENTS

| | | |
|---|---|---|
| DE | 10 2007 060 428 B3 | 5/2009 |
| DE | 10 2009 013 159 A1 | 9/2010 |

(Continued)

OTHER PUBLICATIONS

European Search Report for Application No. 22184078 dated Nov. 30, 2022.

(Continued)

*Primary Examiner* — Matthew W Van Oudenaren
(74) *Attorney, Agent, or Firm* — KDW Firm PLLC

(57) ABSTRACT

A combined cooling and humidifying system for a fuel cell system includes a first line strand, second line strand, gas separator, and water feed device. The first line strand has a supply line for feeding water to a heat exchanger of the fuel cell system and a return line for receiving a water-steam mixture from the fuel cell system. The gas separator is in the return line to at least partially separate the steam from the water-steam mixture and provide it at a steam connection. The second line strand has a fluid inlet for feeding a gaseous fluid to the fuel cell system. The steam connection is coupled to the second line strand downstream of the fluid inlet to admix steam with the fluid. The water feed device is coupled to the supply line to compensate for a separating mass flow of steam in the first line strand.

13 Claims, 2 Drawing Sheets

(51) Int. Cl.
  *B64D 27/24* (2024.01)
  *B64D 33/08* (2006.01)
  *B64D 37/04* (2006.01)
  *H01M 8/04007* (2016.01)
  *H01M 8/04029* (2016.01)
  *H01M 8/04082* (2016.01)
  *H01M 8/04746* (2016.01)

(52) U.S. Cl.
  CPC ........ *B64D 37/04* (2013.01); *H01M 8/04029* (2013.01); *H01M 8/04067* (2013.01); *H01M 8/04164* (2013.01); *H01M 8/04201* (2013.01); *H01M 8/04768* (2013.01); *B60L 58/33* (2019.02); *B60L 2200/10* (2013.01); *H01M 2250/20* (2013.01)

(58) Field of Classification Search
  CPC ......... H01M 8/04768; H01M 8/04141; H01M 8/04059; H01M 8/04358; H01M 8/04417; H01M 8/04492; H01M 8/04507; H01M 8/04723; H01M 8/04835; H01M 8/04843; H01M 8/04522; H01M 8/04514; H01M 2250/20
  See application file for complete search history.

(56) References Cited

U.S. PATENT DOCUMENTS

2009/0214915 A1* 8/2009 Kwon ................ H01M 8/0258
  429/437
2011/0003224 A1* 1/2011 Scheibert .......... H01M 8/04059
  429/434

FOREIGN PATENT DOCUMENTS

| | | |
|---|---|---|
| DE | 10 2009 048 394 A1 | 4/2011 |
| DE | 10 2015 222 635 A1 | 5/2017 |
| DE | 10 2018 219 206 A1 | 5/2020 |
| EP | 3 073 559 B1 | 9/2016 |

OTHER PUBLICATIONS

German Office Action for Application No. 102021117941 dated Mar. 16, 2022.

* cited by examiner

WATER-BASED, COMBINED COOLING AND HUMIDIFICATION SYSTEM FOR A FUEL CELL SYSTEM

CROSS-REFERENCE TO RELATED APPLICATION

This application claims priority to German Patent Application No. DE 10 2021 117 941.6 filed Jul. 12, 2021, the entire disclosure of which is incorporated by reference herein.

TECHNICAL FIELD

The disclosure herein relates to a cooling system for a fuel cell system, to a vehicle having a fuel cell system and to a method for cooling and humidifying the fed gases of a fuel cell system.

BACKGROUND

For the low-emission generation of electrical power with high efficiency, in particular in vehicles, it is known to use fuel cell systems. It is possible in an aircraft for the generators which are used for on-board power supply and which are driven by main engines or an auxiliary turbine to be replaced by a fuel cell system. Such a system could also be used for emergency power supply. The thermal power which arises during operation of the fuel cell system and which is in the same order of magnitude as the electrical power has to be reliably dissipated in order to ensure the satisfactory operation of the fuel cell system.

Particularly on-board an aircraft, a fuel cell system can be cooled in various ways. A conventional cooling circuit can be provided in which a liquid heat-transfer medium circulates, takes up heat from the fuel cell system in so doing and transmits it into the surroundings via an external cooler. DE 10 2009 013 159 A1 describes as a further example for instance a cooler which is integrated into an outer skin of the aircraft and through which ambient air can flow in order to dissipate waste heat generated by a fuel cell system to the surroundings of the aircraft. DE 10 2009 048 394 A1 meanwhile proposes using a cooling circuit which couples the thermal power into a fuel tank. DE 10 2007 060 428 B3 discloses an evaporative cooling system for cooling a fuel cell system in which a cooling medium is converted from the liquid to the gaseous aggregate state by the thermal energy generated during operation of the fuel cell system.

At the same time, to operate fuel cells, it is required to humidify the fed reaction gases in order to prevent drying out of the ion-conducting components. Excessive drying out would damage the components, or would impair the system efficiency by inadequate ion conduction.

SUMMARY

It is an object of the disclosure herein to provide an alternative cooling system with which fuel cells can be efficiently cooled, with at the same time the installation space requirement and the complexity being as low as possible.

The object is achieved by a cooling system disclosed herein. Advantageous embodiments and developments emerge from the following description.

A cooling system for a fuel cell system is disclosed, having a first line strand, a second line strand, a gas separator, and a water feed device, wherein the first line strand has a supply line for feeding water to a heat exchanger of the fuel cell system and a return line for receiving a water-steam mixture from the fuel cell system, wherein the gas separator is arranged in the return line and is designed to at least partially separate the steam from the water-steam mixture and provide it at a steam connection, wherein the second line strand has a fluid inlet for feeding a gaseous fluid to the fuel cell system, wherein the steam connection is coupled to the second line strand downstream of the fluid inlet in order to admix steam with the fluid, and wherein the water feed device for feeding water is coupled to the supply line and is designed to compensate for a separating mass flow of steam in the first line strand.

The first line strand is directly connected to the fuel cell system. In it is circulated water which passes via the supply line into the heat exchanger of the fuel cell system. Thermal coupling between the fuel cell system and the water occurs there, with the result that the water is heated. Arranged downstream of the heat exchanger is the return line which receives a water-steam mixture. The fuel cell system can have an operating temperature of approximately 90° in order to at least partially evaporate the water. The return line is therefore traversed by a two-phase flow which consists of water and steam.

At least some of the steam is separated by the gas separator in the return line and provided at the steam connection. With complete separation of the steam, pure liquid water could flow downstream of the gas separator.

The steam connection therefore continuously provides steam during operation of the fuel cell system. This can be used to humidify the fuel cell system. For this purpose, the steam can be admixed with the fluid in the second line strand that is fed to the fuel cell system. This can for example be air which is fed to the cathode path. Alternatively, it can also be hydrogen or a hydrogen-containing gas mixture which is fed to the anode path of the fuel cell system. Overall, the flowing, gaseous fluid is humidified by the input of steam. For this purpose, the steam connection is connected to the second line strand via a connecting line. As a result, the moisture balance of the fuel cell is positively influenced.

Since, in the first line strand, steam is continuously withdrawn from the cooling circuit by the separation of the steam, the water mass in the first line strand continuously decreases. However, by virtue of the water feed device, this can be compensated for again. Ideally, the water mass in the first line strand remains constant. The water feed device is designed to continuously provide water and thereby compensate for the separating mass flow of steam which flows into the second line strand. Depending on the operating strategy, the stored water quantity can also be temporarily reduced and for example be replenished during the start-up of the overall system.

An additional humidifying device would therefore not be necessary for humidifying the fuel cell system. The cooling system can therefore have a dual function and moreover has a number of advantages. For example, a compensating tank for tolerating an expansion of a coolant within the first line strand is not necessary, since there is no volume increase in the first line strand as a result of the separator. Moreover, water as coolant is uncomplicated in terms of handling. The freezing starting can be accelerated by a targeted reduction of the cooling medium, for example by letting out the coolant before shutting down the fuel cell system, and the reduced heat capacity associated therewith. Because of the evaporation enthalpy occurring at a defined temperature, the temperature increase over the active surface is comparatively low by comparison with a purely heat capacitive cooling of the fuel cell. The active feeding of steam can additionally ensure improved humidification of the fuel cells to be cooled.

The water feed device could have a condenser which is designed to condense steam from the fuel cell system. For this purpose, there could be provided a third line strand which serves for the removal of exhaust air or exhaust gas from the fuel cell system. The condenser can be arranged in the third line strand and is traversed by a flow of exhaust air or exhaust gas of the fuel cell system. It provides condensate, that is to say liquid water, which is fed to the first line strand. As a result of the catalytic conversion of hydrogen and oxygen, a continuous flow of steam, which considerably exceeds the flow of steam present at the steam connection, occurs during the fuel cell process. It can be at least partially recovered by the condenser in order to cover the water requirement in the first line strand. This can be realized in that a cooler is operated below the dew point temperature of the exit gas.

Moreover, a further particular advantage can result therefrom, since the water in the first line strand is, through the provision from condensate, substantially distilled water at least after a certain operating period. The first line strand can be filled at the start with distilled water which is constantly replenished by the condensate. Since the fuel cell system is dependent on a coolant having as low a conductivity as possible, it is usually required to filter accumulated ions out of the coolant by an ion filter. This would not be necessary in this case. The use of distilled water can moreover substantially prevent the occurrence of deposits, for example lime.

The second line strand could have an air inlet and be designed for feeding air to a cathode path of the fuel cell system. A supply air provided to the fuel cell system can therefore be humidified by the cooling system such that the separated steam is fed to the cathode path.

The second line strand could have a first compressor for compressing air downstream of the air inlet, downstream of which can be connected an air intercooler, wherein the steam connection is coupled to the second line strand downstream of the air intercooler. The compressed supply air is preheated to the cell temperature by the air intercooler. The admixing of steam downstream of the air intercooler can meanwhile avoid condensation of the steam, since the gas has already been preconditioned to cell temperature. It could be expedient for the coupling of the steam connection to the second line strand to be configured to be as tight as possible on the fuel cell system.

In one embodiment, the second line strand could have a hydrogen inlet and be designed for feeding hydrogen to an anode path of the fuel cell system. Therefore, in this variant, the hydrogen is humidified before it enters the fuel cell system. However, it is indeed conceivable that both variants can be used at the same time. The steam could therefore simultaneously humidify a supply air flow and a hydrogen flow.

The quantity of liquid water in the first line strand could be detected via a sensor. Depending on the stored water quantity, the output of the condenser could be regulated. When starting up the system, the condenser could be operated with a high output in order to fill the cooling circuit with liquid water. It could be appropriate to regulate the output of the condenser by a control unit in such a way that the total mass of the water in the first line strand is regulated to a predetermined value. For example, the total mass could be kept constant at least intermittently.

A second compressor could be connected downstream of the steam connection and compresses the steam to a pressure which substantially corresponds to or exceeds the pressure in the second strand. If the second line strand is designed for instance to convey a supply air flow to the cathode path, an absolute pressure of approximately 2 bar could be set therein. For active admixing, the steam at the steam connection is then brought to a pressure of 2 bar or slightly higher.

It is particularly advantageous if an absolute pressure in the first line strand is 1 bar absolute. Consequently, the evaporation temperature in the first line strand is set to 100° C. when using pure water. The evaporation of the water accordingly occurs at 100° C. and the fuel cell system is thereby limited to 100° C. with a sufficient mass flow of water. In flight applications, even lower pressures than 1 bar absolute could be operated, which would lead to a correspondingly lower operating temperature.

The air intercooler can be thermally coupled to the second line strand downstream of the water feed unit and upstream of a water supply connection of the second line strand. As a result, the compressed air would be heated to the cell temperature before entering the cell. This could prevent either overheating of the cells at the gas inlet at too high a gas temperature, for example with strong compression, or condensation of the gas humidification at too low a gas temperature. The air intercooler can accordingly provide a thermal exchange between the pressurized air flow and the water flow into the supply line.

The disclosure herein further relates to a vehicle having a fuel cell system with at least one fuel cell and a cooling system according to the preceding description.

The vehicle could be an aircraft, wherein the fuel cell system and the cooling system are arranged in a pressurized region of the aircraft, and a hydrogen tank which can be coupled to the fuel cell system is arranged in a non-pressurized region of the aircraft.

Furthermore, the disclosure herein relates to a method for cooling a fuel cell system, comprising the steps of feeding water to a heat exchanger of the fuel cell system in a supply line of a first line strand, receiving a water-steam mixture from the fuel cell system in a return line of the first line strand, separating at least some of the steam from the water-steam mixture by a gas separator in the return line and providing it at a steam connection, feeding steam from the steam connection into a second line strand with which a gaseous fluid is guided to the fuel cell system, and feeding water from a water feed device into the supply line to compensate for the separated steam.

The method could further comprise condensing steam from an exhaust-gas flow of the fuel cell system by a condenser for feeding to the first line strand.

Here, as explained above, the gaseous fluid could be air as oxidant for a cathode path or hydrogen as fuel for an anode path.

The condensing could, as explained above, be carried out by a condenser whose output is regulated in such a way that the total mass of the water in the first line strand is regulated to a predetermined value. In particular, the total mass can be kept constant at least intermittently.

BRIEF DESCRIPTION OF THE DRAWINGS

Further features, advantages and possible uses of the disclosure herein emerge from the following description of the exemplary embodiments and from the figures. Here, all of the features described and/or illustrated in the figures form the subject matter of the disclosure herein individually and in any desired combination, even independently of the combination of the features in the individual claims or the back-references thereof. Furthermore, in the figures, the same reference signs are used for identical or similar objects.

DETAILED DESCRIPTION

Figure 1:
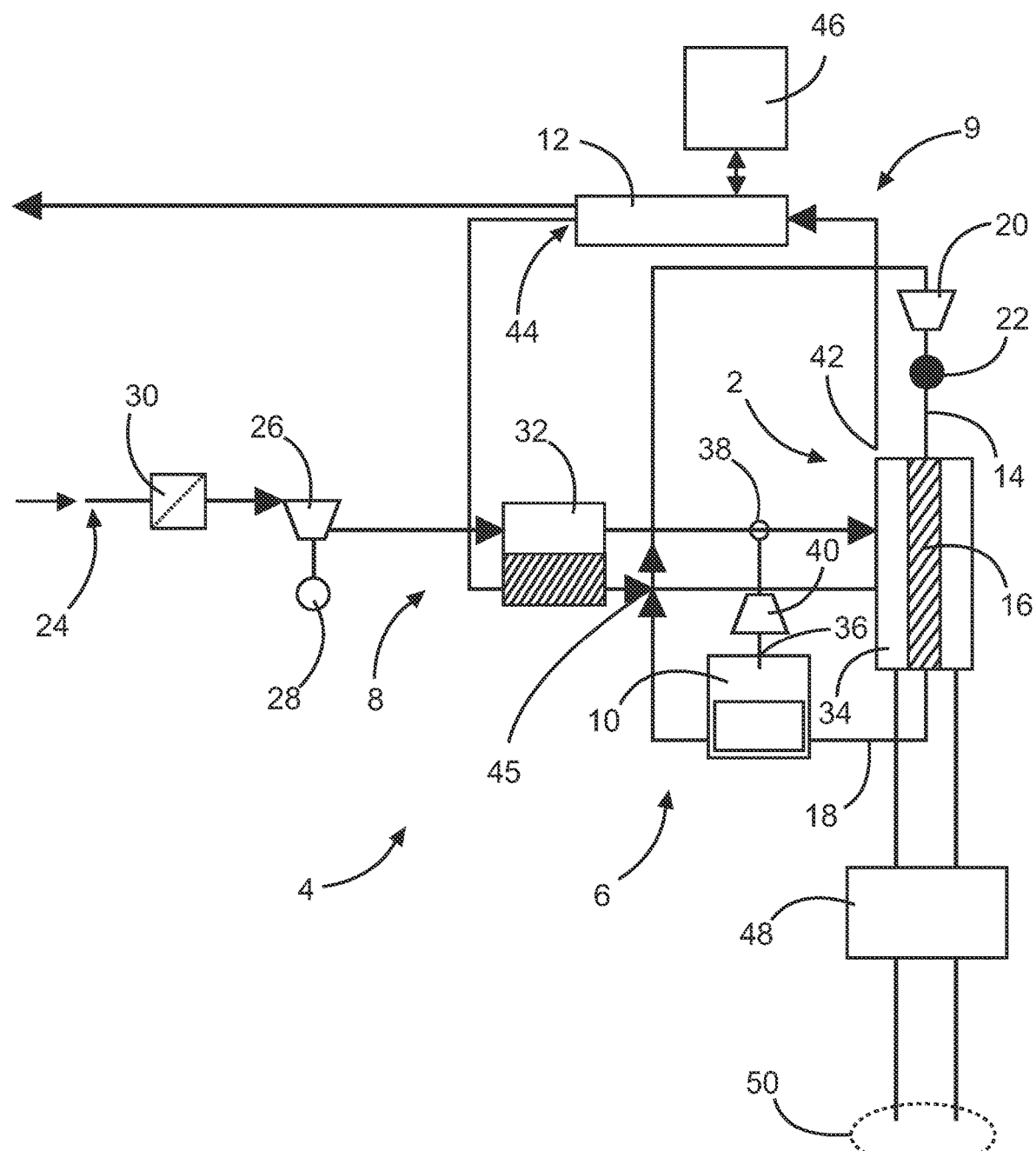
FIG. 1 shows a schematic illustration of a fuel cell system and of a cooling system.

FIG. 1 shows a fuel cell system 2 which is coupled to a combined cooling and humidifying system 4. The system 4 has a first line strand 6, a second line strand 8, a third line strand 9, a gas separator 10 and a water feed device 12. The latter is designed as a condenser, as stated further below.

The first line strand 6 has a supply line 14 which is connected to a heat exchanger 16 of the fuel cell system 2. In the first line strand 6 there is situated pure water which is guided via the first line strand 6 into a heat exchanger 16 of the fuel cell system 2 in order to absorb heat there. The thermal heat power of the fuel cell system 2 causes the water to be at least partially evaporated. With an absolute pressure of 1 bar in the first line strand 6, the water evaporates at 100° C. By virtue of the continuous replenishment of water and the continuous evaporation at the heat exchanger 16, the operating temperature of the fuel cell system 2 can therefore be set to the evaporation temperature of 100° C. Via the pressure level in the evaporator, the temperature of the fuel cell system 2 can be regulated within certain limits.

A mixture of water and steam leaves the heat exchanger 16 as a two-phase flow and passes into the return line 18. The flow flows there through the gas separator 10 which is designed to remove at least some of the steam from the two-phase flow. In the supply line 14 there is also situated a pump 20 which is operated, for example, via an electric motor 22. This could be supplied with electrical power from the fuel cell system 2, optionally via a buffer battery, or from another current source.

The second line strand 8 has an air inlet 24 through which air or oxygen-containing gas flows in. This is conveyed into the second line strand 8 by a first compressor 26 which can be driven by an electric motor 28. There is passage through an air filter 30 here. The compressed air passes into an air intercooler 32 and is then fed to a cathode path 34 of the fuel cell system 2. Separated steam from the gas separator 10 is provided at a steam connection 36 which is coupled to the second line strand 8. A corresponding admixing connection 38 is provided between the air intercooler 32 and the cathode path 34. It is possible to provide here a second compressor 40 for introducing the steam into the air mass flow. By admixing the steam, the air mass flow is therefore humidified directly before reaching the cathode path 34.

Exhaust air or exhaust gas from the fuel cell system 2 is provided at an exhaust-gas connection 42. In this example, the exhaust gas passes via the third line strand 9 into the water feed device 12, which is configured as a condenser, and condenses out water by cooling the exhaust gas below the dew point, for example to approximately 80° C. or somewhat lower. The cooling temperature is set in such a way that enough condensed water accumulates to set the water quantity in the cooling circuit to a desired level. The condensed water accumulates at a condensate connection 44 and is fed to the first line strand 6 at a water feed connection 45, with the result that the loss of steam caused by the humidification can be compensated for again. Before entering the first line strand 6, the water can be used for heating the introduced gas in an air intercooler 32. The condenser 12 can be coupled to a control unit 46 which is designed to regulate the output of the condenser 12 in such a way that the total mass of the water in the second line strand 6 corresponds to a predeterminable total mass and/or is constant.

At an operating temperature of the fuel cell system 2 of 100° C. and 2 bar gas pressure in the line strand 8, the quantity of the evaporated cooling water can result in a humidification degree of the supply air flow of approximately 78% RH, with a gas stoichiometry of 1.8 (the ratio of provided air quantity to consumed air quantity). At the exhaust-gas connection, the air moisture can be approximately 96% RH as a result of the additionally produced water. A temperature of approximately 79° C. is theoretically necessary to recover a sufficient water quantity. At these operating points, an efficient operation of the fuel cell system 2 with high conversion efficiencies can be made possible.

The fuel cell system 2 is connected here to a DC converter 48 which is designed to provide a DC voltage of predetermined level at a voltage connection 50. This can be passed to a voltage bus (not shown here). Consequently, the electric motors 22 and 28 can be connected to operate the cooling and humidifying system 4.

Figure 2:
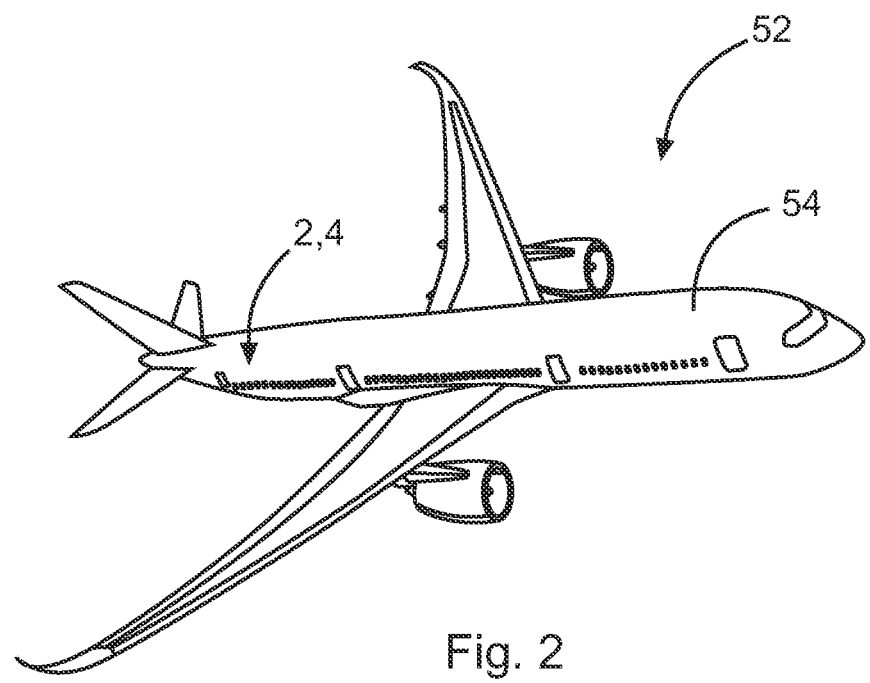
FIG. 2 shows an aircraft.

FIG. 2 shows an aircraft 52 which is equipped with a fuel cell system 2 and with a cooling and humidifying system 4. The fuel cell system 2 is arranged in a rear region of the aircraft 52, for example below a floor and in front of a pressure bulkhead, that is to say in a pressurized region of a fuselage 54.

Figure 3:
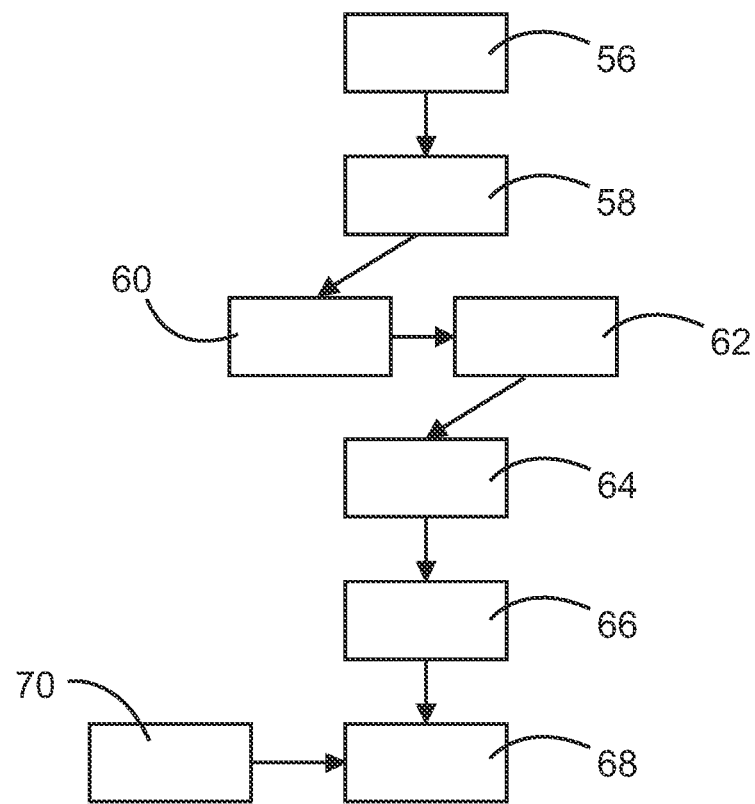
FIG. 3 shows a method as a schematic block diagram.

Finally, FIG. 3 shows a schematic illustration of a method for cooling the fuel cell system 2 and comprises the steps of feeding 56 water to the heat exchanger 16 of the fuel cell system 2 in the supply line 14 of a first line strand 8, receiving 58 a water-steam mixture from the fuel cell system 2 in the return line 18 of the first line strand 8, separating 60 at least some of the steam from the water-steam mixture by the gas separator 10 in the return line 18 and providing 62 it at the steam connection 36, feeding 64 steam from the steam connection 36 into the second line strand 8 with which a gaseous fluid is guided to the fuel cell system 2, and feeding 66 water from the water feed device 12 into the supply line 14 to compensate for the separated steam. The feeding 66 can be preceded by the condensing 68 of steam from an exhaust-gas flow of the fuel cell system 2 by the condenser 12. Its output can be regulated 70 in such a way that the total mass of the water in the first line strand 6 is set to a predetermined value and is in particular kept constant.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 Fuel cell system
4 Cooling system

6 First line strand
8 Second line strand
9 Third line strand
10 Gas separator
12 Water feed device/condenser
14 Supply line
16 Heat exchanger
18 Return line
20 Pump
22 Electric motor
24 Air inlet/fluid inlet
26 First compressor
28 Electric motor
30 Air filter
32 Air intercooler
34 Cathode path
36 Steam connection
38 Admixing connection
40 Second compressor
42 Exhaust-gas connection
44 Condensate connection
45 Water feed connection
46 Control unit
48 DC converter
50 Voltage connection
52 Aircraft
54 Fuselage
56 Feeding
58 Receiving
60 Separating
62 Providing
64 Feeding
66 Feeding
68 Condensing
70 Regulating

The invention claimed is:

1. A cooling and humidifying system for a fuel cell system, comprising:
   a first line strand having a supply line for feeding water to a heat exchanger of the fuel cell system and a return line for receiving a water-steam mixture from the fuel cell system;
   a second line strand having a fluid inlet into which a gaseous fluid flows and a fluid supply configured for feeding the gaseous fluid to the fuel cell system;
   a gas separator disposed in the return line of the first line strand and configured to at least partially separate steam from the water-steam mixture and provide the steam at a steam connection;
   a water feed device coupled to the supply line of the first line strand and configured for feeding water to compensate for a separating mass flow of steam from the first line strand;
   wherein the steam connection is coupled to the second line strand downstream of the fluid inlet to admix steam with the gaseous fluid;
   wherein a second compressor is connected downstream of the steam connection and is configured to compress the steam to a pressure which corresponds to or exceeds a pressure in the second line strand; and
   wherein an absolute pressure in the supply line of the first line strand is equal to or less than 1 bar.

2. The cooling and humidifying system according to claim 1,
   further having a third line strand for removing exhaust gas of the fuel cell system,
   wherein the third line strand is connected to an exhaust-gas connection, and
   wherein the water feed device has a condenser to condense steam from the fuel cell system.

3. The cooling and humidifying system according to claim 1, wherein the fluid inlet comprises an air inlet and;
   wherein the fluid supply is configured for feeding air to a cathode path of the fuel cell system.

4. The cooling and humidifying system according to claim 3,
   wherein the second line strand has a first compressor for compressing air downstream of the air inlet, downstream of which an air intercooler is connected, and
   wherein the steam connection is coupled to the second line strand downstream of the intercooler.

5. The cooling and humidifying system according to claim 1, wherein the second line strand has a hydrogen inlet and is configured for feeding hydrogen to an anode path of the fuel cell system.

6. The cooling and humidifying system according to claim 2, further having a control unit which is coupled to the condenser and is configured to regulate an output of the condenser such that a total mass of water in the first line strand is regulated to a predetermined value.

7. The cooling and humidifying system according to claim 6,
   wherein the fluid inlet comprises an air inlet; and
   wherein the fluid supply is configured for feeding air to a cathode path of the fuel cell system,
   wherein the second line strand has a first compressor for compressing air downstream of the air inlet, downstream of which an air intercooler is connected,
   wherein the steam connection is coupled to the second line strand downstream of the intercooler, and
   wherein the air intercooler is thermally coupled to the second line strand downstream of a water feed unit and upstream of a water supply connection of the second line strand.

8. A vehicle having a fuel cell system with at least one fuel cell and a cooling and humidifying system according to claim 1.

9. The vehicle according to claim 8,
   wherein the vehicle is an aircraft,
   wherein the fuel cell system and the cooling and humidifying system are arranged in a pressurized region of the aircraft, and
   wherein a hydrogen tank coupled to the fuel cell system is arranged in a non-pressurized region of the aircraft.

10. A method for cooling a fuel cell system, comprising:
   feeding water to a heat exchanger of the fuel cell system in a supply line of a first line strand;
   receiving a water-steam mixture from the fuel cell system in a return line of the first line strand;
   separating at least some of the steam from the water-steam mixture by a gas separator in the return line and providing the steam at a steam connection;
   feeding a gaseous fluid into a fluid inlet of a second line strand;
   compressing steam from the steam connection to a pressure which corresponds to or exceeds a pressure in the second line strand;
   admixing the steam into the gaseous fluid in the second line strand to produce a humidified fluid flow;
   feeding the humidified fluid flow to the fuel cell system; and
   feeding water from a water feed device into the supply line for compensating for the separated steam;

wherein an absolute pressure in the first line strand is equal to or less than 1 bar.

11. The method according to claim 10, further comprising condensing steam from an exhaust-gas flow of the fuel cell system by a condenser for feeding to the first line strand.

12. The method according to claim 10, wherein the gaseous fluid is air as oxidant for a cathode path or hydrogen as fuel for an anode path.

13. The method according to claim 11, wherein the condensing is carried out by a condenser whose output is regulated such that a total mass of water in the first line strand is kept constant.

* * * * *